INVENTOR.
NORMAN L. CONGER
BY
ATTORNEY

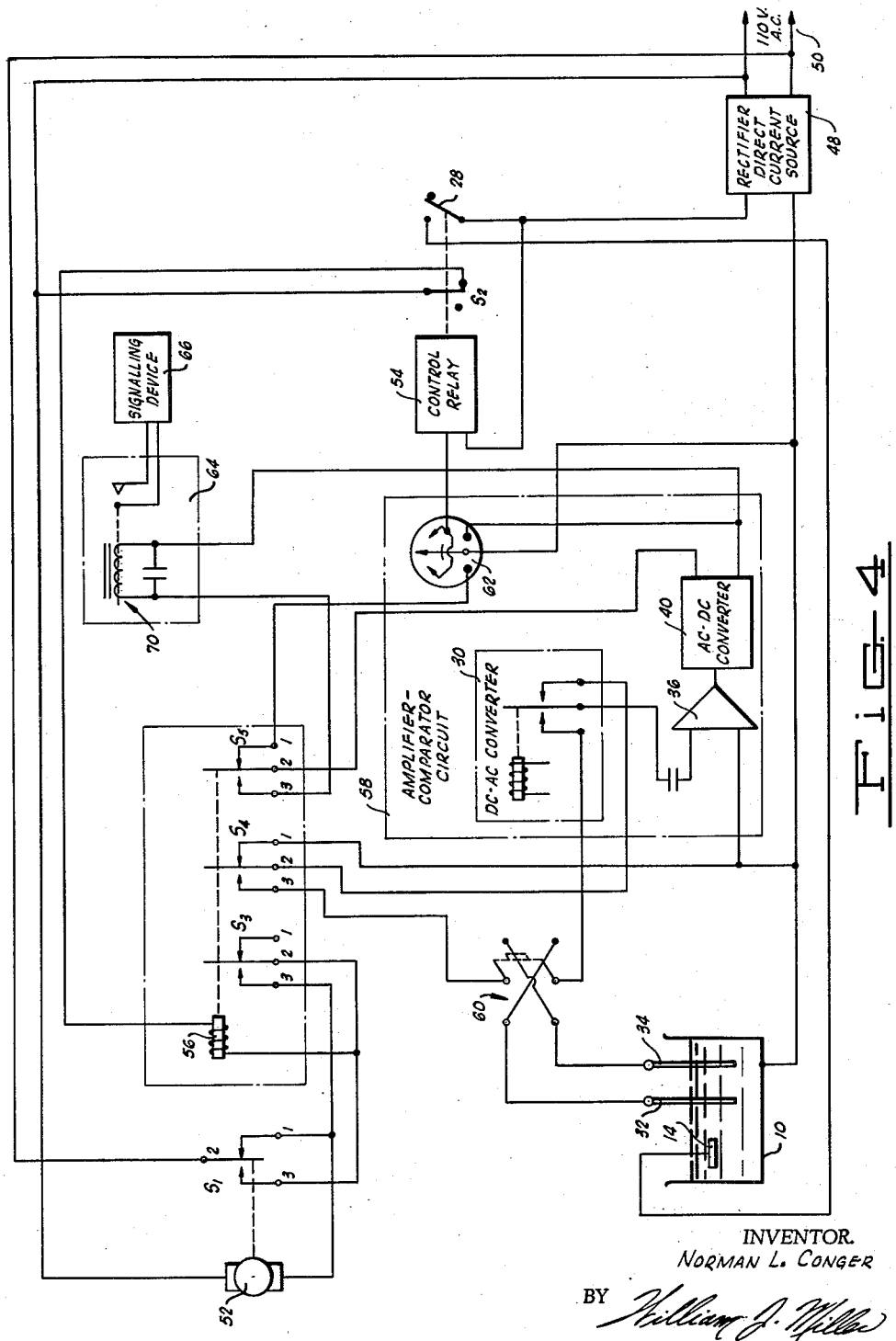

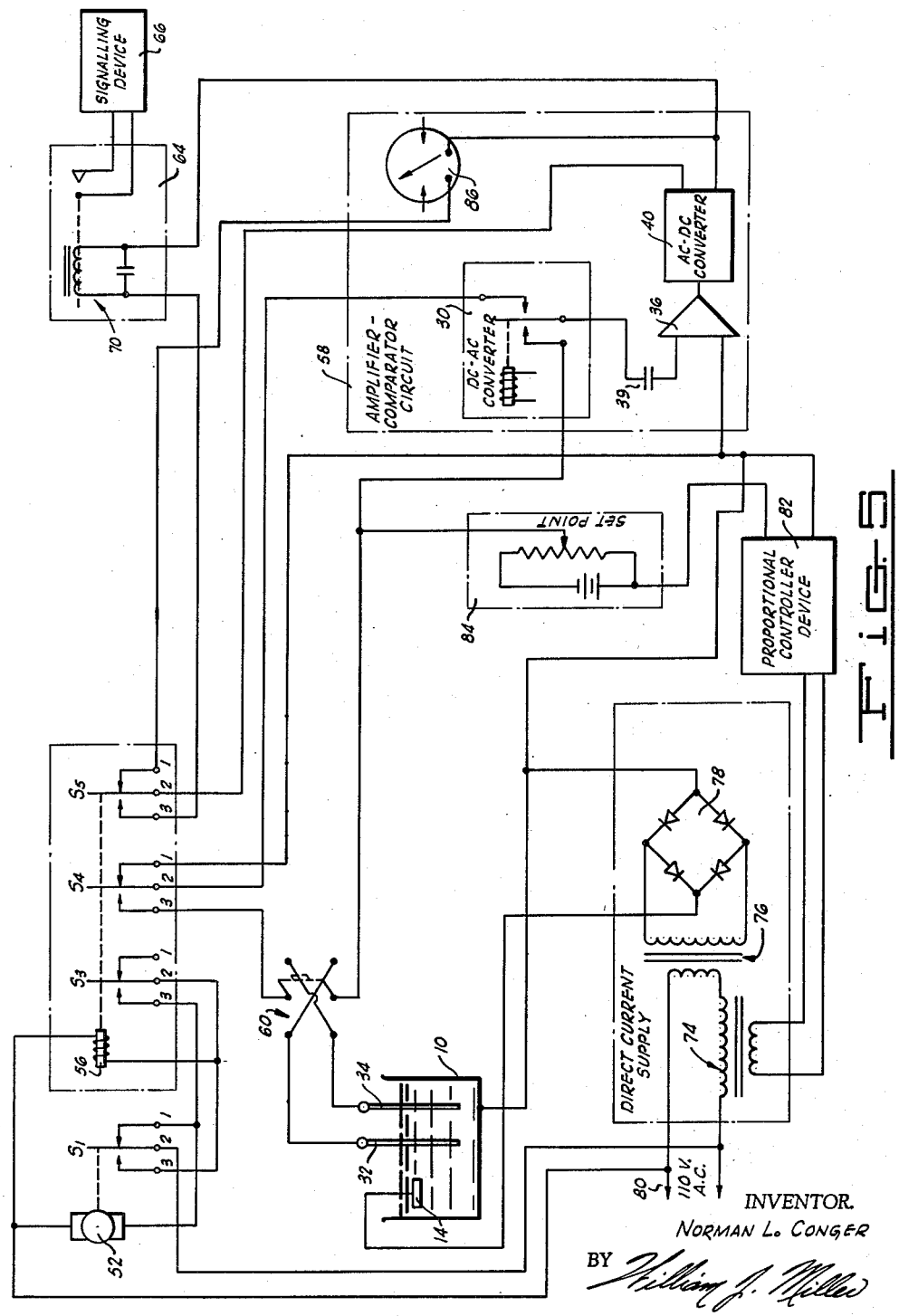

3,197,755
APPARATUS FOR DETECTING AND CORRECTING MALFUNCTION OF A STANDARD, REFERENCE ELECTRODE
Norman L. Conger, Ponca City, Okla., assignor to Continental Oil Company, Ponca City, Okla., a corporation of Delaware
Filed Sept. 7, 1961, Ser. No. 136,550
8 Claims. (Cl. 340—253)

This invention relates to a method and apparatus for detecting malfunctioning of a standard, reference electrode. More particularly, but not by way of limitation, the present invention relates to a method and apparatus for detecting the failure of a standard, reference electrode utilized in an anodic polarization system for protecting metals against corrosive attack by a corrosive electrolyte.

At it is well-known in the art of corrosion control, the corrosion of many metals may be prevented or largely reduced by inducing passivity in the metal by anodic polarization techniques. Recently, a method and apparatus for corrosion prevention by means of anodic polarization has been developed wherein the anodic current employed is passed between the metallic vessel to be protected and the inert electrodes suspended in the electrolyte in the vessel. The manner in which the current is applied, that is, the period during which it is applied and its magnitude, is determined by the potential of the metallic vessel at any time, which potential is indicative of the rate at which the metal of the vessel will corrode. The potential of the vessel continually changes, both after the anodic current has been passed through the electrolyte for a short period of time, as well as after the anodic current is interrupted and the metallic vessel is allowed to stand quiescently without the passage of such current for a period of time.

In order to be constantly apprised of the potential of the metallic vessel, the cited method and apparatus for anodic polarization proposes that the potential of the vessel be constantly measured against a standard, reference electrode and the indicated potential difference between the vessel and the standard electrode then be utilized to actuate a suitable controller for starting and stopping the flow of anodic current. In other words, when the potential difference between the vessel and the standard, reference electrode reaches a predetermined value indicating the approach of an increased rate of corrosion, the anodic current is passed from the vessel to the inert electrode to again decrease the rate of corrosion to a desirably low level, at which point the anodic current is discontinued. This process of intermittently directly anodic current through the electrolyte contained within the vessel is repeated as long as the vessel is exposed to the corrosive solution, and it has been determined that when the apparatus utilized in the method is functioning properly, a substantial reduction in corrosion results.

The described method of anodic polarization corrosion prevention may be said to employ an ON-OFF switching circuit to maintain the potential of the vessel at or near a value at which no appreciable corrosion results. This is because the corrective anodic current is passed from the vessel to the electrode only intermittently in response to a given departure of the vessel potential from its noncorroding or passive value. The use of such ON-OFF switching circuits in anodic polarization systems is accompanied by several disadvantages relating to the degree of control attainable and the service life of such switching circuits. Most of these disadvantages are overcome in a modified anodic polarization system in which a proportional controller circuit is utilized instead of an ON-OFF switching circuit. The proportional controller circuit is connected to the standard, reference electrode and to the vessel and converts any deviation of the vessel potential from that required for vessel passivity to a signal. This signal is in the form of a direct current which is applied to the control winding of a saturable reactor connected in series with an alternating current source. The saturable reactor is also connected in series with a step-down transformer and a rectifier so that the magnitude of the direct current output from the rectifier is always directly proportional to the magnitude of the deviation of vessel potential from the value required for passivity of the vessel. The direct current output from the rectifier is, of course, applied as the corrective anodic current which is passed from the vessel to the inert electrode. In anodic polarization systems employing such proportional controller circuits, better control of the vessel potential is constantly maintained; and the life of the system is generally longer than those systems employing ON-OFF switching circuits.

Unfortunately, in both of the described anodic polarization systems, the apparatus which has previously been provided for monitoring the potential of the vessel to be protected has sometimes proved subject to malfunctioning when operated over extended periods of time. It has been determined that this malfunction is due to the failure of the standard, reference electrode to continue to accurately indicate the potential difference between the standard, reference electrode and the vessel. As is well-known in the art, such standard electrodes are highly sensitive, somewhat delicate electrochemical devices which must be well protected from adverse mechanical or chemical conditions in order to function properly. It is not surprising, therefore, that conditions sometimes exist or arise in anodic polarization systems which cause the standard, reference electrode to acquire an untrue potential with respect to the potential of the vessel. This condition, of course, then results in improper control of the anodic current so that the corrosion rate of the vessel may be, in actuality, increased rather than decreased.

The seriousness of such failures or malfunctioning of the reference electrode in anodic polarization systems is aggravated in that such failures generally occur gradually over an extended period of time and are thus reflected only as a gradual, almost imperceptible, increase in current requirements. This change in anodic current requirements may be mistaken, even by personnel experienced in anodic corrosion protection techniques, as a change in the current requirements of the vessel due to gradually changing vessel potential. Consequently, the first realization of poor performance of the system may be obtained only when a leak in the vessel occurs due to excessive corrosion, or when the corrosive electrolytic product contained in the vessel deteriorates substantially in quality. The problem of detection of reference electrode malfunction becomes particularly acute in high corrosion systems where the metal of the vessel is lost at a very high rate in the event the reference electrode fails to function properly.

The present invention contemplates a method and apparatus for monitoring the performance of the standard, reference electrode so that any departure from an accurate evaluation of the vessel potential by use of the reference electrode may be immediately detected. The invention further contemplates means utilized in conjunction with said monitoring and detecting system for apprising an operator of any deterioration of the reference electrode, and for automatically restoring the system to proper operation when total failure of the electrode occurs. Monitoring of the performance of the standard, reference electrode is accomplished by the use of a second standard, reference electrode which is located in electrical contact with the electrolyte contained within the vessel, and which functions to simultaneously act as a reference for the measurement of the vessel potential. Deviations of the potential differences existing between the vessel and each of the two standard, reference electrodes are then compared in a suitable potential comparator circuit and the deviation between these two potential differences is suitably amplified. In the following portions of the specification, the potential differences to which reference is made will be the potential differences existing between the vessel and each of the two standard electrodes.

Since it may be impractical to provide two standard, reference electrodes and their associated circuitry which are identical in all respects, a small amount of deviation in the indicated potential differences existing between the two reference electrodes and the vessel is to be anticipated. However, if one of the standard, reference electrodes becomes defective, or if, for some reason, the potential difference between the vessel and one of the standard, reference electrodes is not truly represented, the deviation between the two potential differences between each of the reference electrodes and the metallic vessel will increase sharply, indicating that one of the standard, reference electrodes is not performing properly. The small range of normal deviation between the two potential differences may be ascertained with sufficient exactly to permit a limiting value of deviation to be established, beyond which a suitable signaling device will be actuated to call the attention of an operator to the fact that one of the standard, reference electrodes is functioning improperly. In a preferred embodiment of the invention, a selector switch is provided to allow either of the standard, reference electrodes to be electrically connected to the anodic current control system. In cases of total failure of one of the standard, reference electrodes, provision may be made for this switch to automatically connect the other reference electrode to the anodic current controller. The present invention also contemplates, in two of its embodiments, the integration of the comparator-amplifier circuit into anodic current control circuits of the ON-OFF switching circuit type and the proportional controller circuit type so that the reference potentials between each of the standard electrodes and the vessel will be compared periodically without interfering with the proper functioning of the circuitry controlling the flow of anodic current. Such periodic comparison is, of course, more economical than constant comparison.

Of course, the comparator-amplifier circuit and its associated signaling device function only to provide an indication that one of the two standard, reference electrodes is not functioning properly. It will, however, be possible for maintenance personnel, by virtue of their experience, to determine which standard electrode is faulty. Experience with the invention to date indicates that a faulty standard electrode nearly always reads a lower (less negative) potential than a properly performing reference electrode. This type of information, along with the history of the anodic current requirement for a particular vessel, should make it quite easy to identify the faulty electrode.

An important object of this invention is to provide a novel method of and apparatus for maintaining and continuing surveillance of the performance of a standard, reference electrode in a system for inhibiting corrosion by anodic polarization whereby the failure of such standard, reference electrode to function properly may be immediately detected.

Another object of the present invention is to provide a second standard, reference electrode in an anodic polarization system for preventing corrosion so that the length of time which production may be continued is extended substantially.

An additional object of the present invention is to provide an apparatus for automatically switching from a working reference electrode to a stand-by reference electrode in a system for protecting a metallic vessel against corrosion by the use of anodic current.

Another object of the present invention is to provide a method and apparatus for improving the product quality control which may be maintained when an anodic polarization system is utilized to protect the product-containing vessels from corrosion.

A further object of the present invention is to provide a method and apparatus for detecting small deviations in the potential of a standard, reference electrode and for facilitating the correction of such deviations.

Another object of this invention is to provide a system for determining, at any given time, whether the reference electrode in an anodic polarization system is functioning properly, which apparatus is simple and relatively inexpensive to construct, is easily operated by ordinary operating personnel, and which is characterized by a long and trouble-free operating life.

A further object of the present invention is to provide a system for preventing vessel corrosion by the passage of an anodic current through a corrosive electrolytic solution contained in the vessel, which system includes electrical circuitry for periodically monitoring the standard electrode used in such systems for the purpose of detecting malfunction of said standard electrode.

Other objects and advantages of the invention will be evident from the following detailed description, when read in conjunction with the accompanying drawings which illustrate my invention.

In the drawings:

FIGURE 1 is a schematic drawing illustrating an anodic polarization system of the type utilizing an ON-OFF switching circuit for protecting a metallic vessel against corrosive attack. The FIG. 1 illustration is provided to show the arrangement of the elements of a typical system prior to the incorporation of the present invention therein so that the function of the present invention may be more clearly understood.

FIGURE 4 is a circuit diagram illustrating a preferred arrangement for incorporating the circuit illustrated in FIG. 2 in the anodic polarization system shown in FIG. 1.

FIGURE 5 is a circuit diagram illustrating an arrangement for incorporating the circuit illustrated in FIG. 2 in an anodic polarization system of the type having a proportional controller circuit for constantly controlling the flow of anodic current from the vessel to be protected to an inert electrode.

Figure 1:
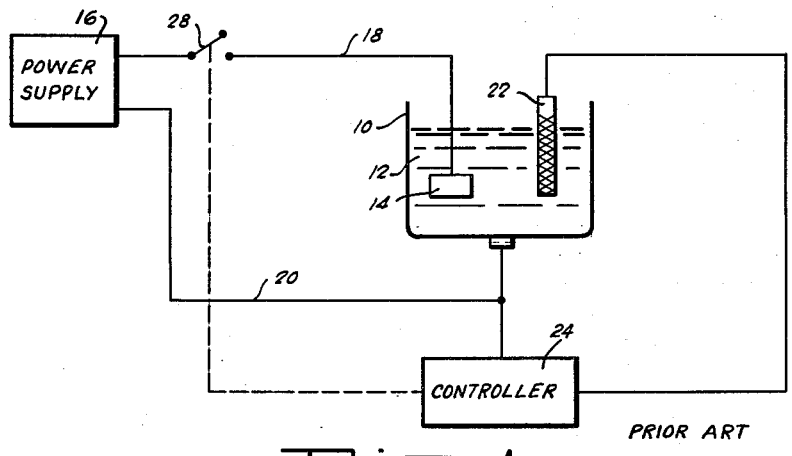

Referring to the drawings in detail and particularly to FIG. 1, reference character 10 designates a vessel, such as a tank, which contains an electrolytic corrosive solution 12 and which is to be protected against the corrosive action of the solution. An inert electrode 14 is suspended or otherwise supported in the solution 12 and is connected to the negative side of a source 16 of direct current energy by the conductor 18. The electrode 14 may be constructed of any material which is inert to the solution 12 and resists changes in potential as a current is passed therethrough, i.e., a material which does not polarize. The positive side of the power supply 16 is connected by a conductor 20 to the vessel 10. It will thus be seen that the vessel 10 functions as an anode, and that the electrode 14 functions as a cathode.

The rate of corrosion of the vessel 10 will vary with the potential of the vessel, and the corrosion may be prevented, or at least minimized, by anodically polarizing the vessel. The potential of the vessel 10 is determined with respect to a standard, reference electrode located in the E.M.F. table at a lower or more noble position than the material of the vessel. When the vessel 10 is made the anode of an electrochemical cell, the potential of the vessel shifts in the more noble direction. When this shift is of sufficient magnitude, the corrosion stops and it is said that the vessel 10 has become passive. In this connection, it should be noted that the sign of the potential difference between the vessel 10 and the standard electrode is of no consequence insofar as the nobility (the relative position in the E.M.F. table of the vessel) is concerned, i.e., the sign of this potential difference may be positive or negative or change as the vessel is made more noble. When the passage of anodic current through the electrolyte is ceased, the potential of the vessel 10 very slowly shifts in the less noble direction so that following an appreciable period of time after the anodic current has stopped, passivity of the vessel will be lost and corrosion will commence.

In order to measure and control the potential of the vessel 10, a standard electrode 22 communicates electrochemically with the solution 12 and a suitable ON-OFF type anodic current controller 24 is connected across the electrode 22 to the vessel 10. The standard electrode 22 may be of any suitable type, such as a calomel cell, a silver-silver chloride cell, a copper-copper sulfate cell or a hydrogen cell. The ON-OFF type anodic current controller 24 functions to operate a switch 28 in the conductor 18 to periodicaly impose a uniform potential between the vessel 10 and cathode 14 in accordance with the potential existing at that time between the vessel 10 and the standard electrode 22. Thus, the switch 28 is periodically closed by the controller 24 to pass a current from the vessel 10 through the solution 12 to the inert electrode 14 until the vessel 10 becomes passivated and the rate of corrosion has decreased to a low level. This decrease in the rate of corrosion will be reflected by a change in the potential of the vessel 10 so that the potential difference between the standard electrode 22 and the vessel will reach a certain predetermined value which is fed into the controller 24. The controller will then open the switch 28 to preclude further flow of anodic current between the inert electrode 14 and the vessel 10. Upon cessation of the anodic current, the potential between the vessel 10 and the standard electrode 22 will gradually change and the vessel 10 will, therefore, again gradually become less noble.

From the foregoing description, it will be perceived that the ON-OFF type controller 24 monitors variations in the potential between the vessel 10 and the standard electrode 22, and when this potential reaches a level at which the corrosion rate of the vessel becomes unacceptably high, the controller 24 closes switch 28 to again impose a potential between the vessel 10 and the cathode 14 and induce another anodic current. This stepwise procedure is repeated to provide a minimum of corrosion in the vessel 10. It will be appreciated, of course, that, instead of using the ON-OFF switching circuit depicted in FIG. 1 for controlling the anodic current, a proportional controller circuit of the type hereinbefore described may be utilized.

As has previously been discussed, anodic corrosion protection systems of the general type depicted in FIG. 1, as well as those utilizing a proportional controller, have sometimes failed to function with the desired efficiency over extended periods of time due to the failure of the standard, reference electrode 22 to continue to accurately monitor the potential difference between the standard, reference electrode and the vessel 10. Since the failure of the standard, reference electrode usually occurs in the form of a gradual drift of the potential of the standard electrode from its rated value, it has previously been virtually impossible to detect such malfunctioning of the standard electrode; with the result that serious damage to the vessel or substantial loss of product quality has occurred before the malfunctioning of the standard electrode was detected.

In one of its broader aspects, the present invention comprises a method of constantly monitoring the performance of the standard electrode used in a corrosion control system of the type depicted in FIG. 1 so that any failure of performance of the standard electrode may be conveniently detected. The monitoring system broadly comprises a second, or stand-by, standard electrode which is in contact with the corrosive solution alongside the working standard, reference electrode to be monitored, and means for constantly comparing the potential differences between each of the standard electrodes and the metallic vessel. Circuit diagrams illustrating two embodiments of the present invention are illustrated in FIGS. 2 and 3.

Figure 2:
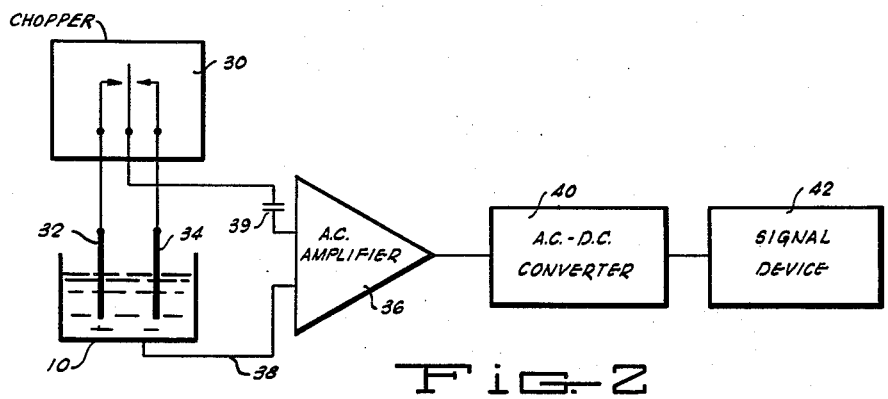
FIGURE 2 is a circuit diagram of a preferred embodiment of the invention.

In FIG. 2, a preferred circuit for monitoring the performance of the standard, reference electrode is illustrated. The circuit comprises a suitable electronic or mechanical monitoring device 30 for converting a direct current of square-wave form to alternating current. The monitoring device is connected across a pair of identical standard electrodes 32 and 34 and to an alternating current amplifier 36. The vessel 10 is connected in the circuit by means of an electrical lead 38. The monitoring device 30 may be a suitable electronic chopper circuit capable of detecting deviations in the potential differences between the vessel 10 and each of the standard electrodes 32 and 34, and capable of converting the direct current resulting from such deviation to alternating current. The device 30 may also be a suitable mechanical vibrator circuit in which a vibrator alternately places one, then the other, of said standard electrodes in the circuit with the vessel 10. By properly controlling the frequency of the vibrator and its period of dwell at each of the standard electrode contacts, a square-wave output voltage displaying substantially straight-line wave form characteristics may be obtained when both standard electrodes 32 and 34 possess the same potential relative to the potential of the vessel 10. An output voltage of square-wave form but of varying amplitude occurs when one of the standard electrodes registers a different potential difference with the vessel 10 than does the other. The resulting varying direct current of square-wave form is then converted into alternating current which passes through the capacitor 39 and enters the amplifier 36 where it is greatly amplified in magnitude. The amplified alternating current is then converted by a suitable converter 40 into direct current and is utilized to actuate a signal device 42, indicating that one of the two standard electrodes 32 or 34 is not functioning properly.

Although the standard electrode monitoring circuit of FIG. 2 as thus described does not provide an indication of which one of the two standard electrodes 32 or 34 has ceased to function properly, it is a relatively simple matter for an operator to quickly check the potential of the electrodes to determine which electrode is responsible for the actuation of the signal device 42 by virtue of a departure from its rated potential. Experience with the invention thus far indicates that a faulty standard electrode nearly always reads a lower (less negative) potential than a properly performing electrode, and if economy of construction is not a serious consideration, suitable electronic devices may be incorporated in the circuit to give an indication of which of the standard electrodes is not performing properly. The monitoring circuit illustrated in FIG. 2 is very sensitive to deviations between the potential differences measured by the standard electrodes 32 and 34, and a difference as small as ten millivolts between these voltages may be detected and the resulting current amplified to actuate the signal device 42.

Figure 3:
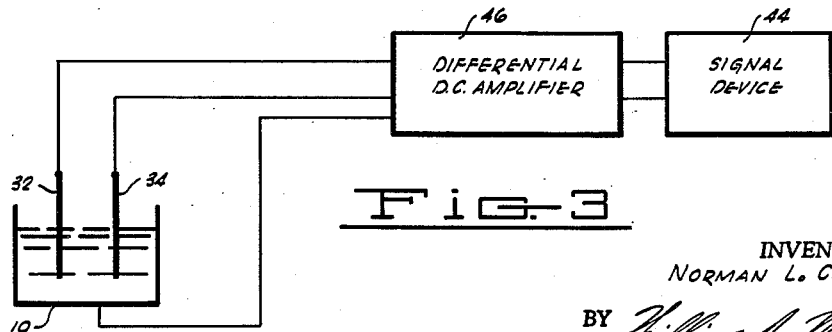
FIGURE 3 is a circuit diagram of a modified embodiment of the invention.

In FIG. 3, a simpler and more economical, though less sensitive, monitoring circuit is depicted. Each of the standard electrodes, 32 and 34, and the vessel 10 is connected in a suitable bridge circuit so that the bridge is balanced as long as the potential differences between the vessel 10 and each of the standard electrodes 32 and 34 are identical. A deviation of these potential differences from each other, however, results in a direct current output from the bridge circuit, and this direct current may be amplified for the purpose of actuating a suitable signal device 44. In the FIG. 3 circuit diagram, the bridge circuit and direct current amplifier are depicted as a single unit designated by reference character 46.

As has been indicated, the monitoring circuit of FIG. 3 is considerably less sensitive to slight deviations in the potential differences measured by the two standard electrodes 32 and 34 than is the monitoring circuit of FIG. 2. The former circuit thus may feasibly be utilized, for example, where deviations of the order of fifty to one hundred millivolts may be tolerated. In the case of either circuit, it may be desirable to set the signal devices 42 and 44 so that no signal will be produced until the deviation exceeds a predetermined value, since some slight deviation may be expected even when both standard electrodes are new and functioning properly. Alternatively, a suitable balancing device, such as a rheostat, might be connected across the electrodes to eliminate any innate difference which may exist in the potential of the two electrodes.

In the circuitry depicted in FIG. 4, a source of direct current corresponding to the source 16 illustrated in FIG. 1 comprises a suitable rectifier 48 for converting alternating current from a suitable source 50 to direct current. The direct current output from the source 48 is supplied to the vessel 10 and inert electrode 14 through a switch 28 in the same manner as the direct current is supplied to these elements in the FIG. 1 circuit.

The remainder of the FIG. 4 circuitry functions to permit the two standard, reference electrodes 32 and 34 to be compared and monitored for correct performance at such times as no anodic current is being passed between the vessel 10 and inert electrode 14—that is, at such times as the metal of the vessel is passive. Since there is no need to constantly monitor the standard, reference electrodes 32 and 34 even at such times as the control circuit is not causing anodic current to be passed from vessel 10 to inert electrode 14, a timing motor 52 is provided to periodically cause the standard electrodes 32 and 34 to be compared in a manner hereinbefore described. Thus, the timing motor 52 is utilized to select the frequency at which a working standard electrode 34 and a stand-by standard electrode 32 will be compared by the monitoring circuit.

The timing motor 52 is connected to the source of alternating current 50 through a single pole, double throw switch $S_1$ which has contacts 1, 2 and 3. The motor 52 is provided with suitable cam means (not shown) for periodically throwing switch $S_1$ to a position to open contacts 1 and 2, and to close contacts 2 and 3. A second switch $S_2$, which, along with switch 28, is positioned for actuation by a control relay 54, is connected to one terminal of the A.C. source 50 and to the energizing coil of a relay 56. The other end of the coil of relay 56 is connected to one leg of a holding circuit which includes the switch $S_3$ actuated by the relay 56 and the cam-actuated switch $S_1$.

Two additional switches $S_4$ and $S_5$, each having contacts 1, 2 and 3, are also actuated by the relay 56, and their state of actuation will determine, as hereinafter described, whether the amplifier-comparator circuit 58 is employed to monitor and compare the performances of the standard electrodes 32 and 34, or is instead utilized to signal the departure of the vessel potential from a value indicating passivity and corrosion resistance.

The amplifier-comparator circuit 58 is comprised of the elements enclosed within the dashed line rectangle designated by this reference character, and is substantially identical to the monitoring circuit depicted in FIG. 2. The direct current to alternating current converter 30, which functions in the manner previously described, is connected by one of its terminals to contact 2 of switch $S_4$ and by its other terminal to a double pole, double throw reversing switch 60. The double pole, double throw reversing switch 60 is connected from its other terminals to each of the standard, reference electrodes 32 and 34, and to contact 3 of switch $S_4$. It will thus be apparent that the reversing switch 60 functions to permit either of the standard, reference electrodes 32 or 34 to be connected directly to the direct current to alternating current converter 30 while the other standard, reference electrode is connected to the direct current to alternating current converter only when contacts 2 and 3 of switch $S_4$ are closed. Contact 1 of switch $S_4$ is connected to the vessel 10.

The output from the amplifier-comparator circuit 58 is passed through relay-actuated switch $S_5$ which is connected by contacts 1 and 3 to a meter relay 62 and a signal sensing element 64, respectively. Thus, depending upon the state of actuation of switch $S_5$, the output from the amplifier-comparator circuit 58 may alternately be used to energize the meter relay 62 or a signaling device 66 which is connected to the signal sensing element 64. The meter relay 62 functions to energize the control relay 54 in response to the passage of a current of predetermined magnitude through the meter relay.

As will be more clearly explained hereinafter, the signal device 66 is an element of the standard electrode monitoring system of the invention, and functions when the relay 56 is energized to shift the amplifier-comparator circuit 58 from an anodic current control function to a standard electrode monitoring function. The signal sensing element 64 will function to permit the signal device 66 to be actuated when a deviation between the standard, reference electrodes 32 and 34 of a predetermined magnitude occurs. Generally, it will be desirable to adjust the sensitivity of the sensing element 64 so that a slight amount of inherent deviation between the potential differences between each of the standard, reference electrodes 32 and 34 and the vessel 10 will not be sufficient to actuate the signal device 66. It is also desirable, in order to avoid the actuation of an alarm signal in the signaling device 66 due to unstabilized conditions in the amplifier-comparator 58, to provide a suitable time delay relay 70 in the signal sensing element 64. The time constant of the time delay relay will be timed to permit the amplifier-comparator circuit 58 to stabilize after it is shifted to its monitoring function before the signaling device 66 is actuated.

*Operation*

In order to provide for a more economic operation of the anodic current corrosion control system, the preferred embodiment of the present invention depicted in FIG. 4 functions to monitor the performance of the standard electrodes 32 and 34 only periodically, and then only at such times as switch $S_2$ is closed by control relay 54 and switch 28 is in the "OFF" position, thereby preventing the passage of current between the inert electrode 14 and the vessel 10.

When the timing motor 52 is started, it will rotate until its associated cam (not shown) throws switch $S_1$ to a position in which its contacts 2 and 3 are closed. As soon as these contacts are closed, the relay 56 will be energized, provided that the switch $S_2$ is at that time closed. However, if the latter switch is in the open position in response to actuation by the control relay 54, throwing of the switch $S_1$ by the cam of timing motor 52 will break the circuit through the timing motor, thus stopping the motor until the control relay 54 again closes switch $S_2$ and the anodic current control circuit is opened at switch 28. In this way loss of, or interference with, corrosion control by the electrode monitoring circuit is prevented at times when flow of the vessel passivating current is required to combat corrosion.

Assuming that the switch $S_2$ is closed as shown in FIG. 4, the energization of the relay 56 throws switches $S_3$, $S_4$, $S_5$. As switch $S_3$ is thrown to close its contacts 2 and 3, a holding circuit including the timing motor 52, switch $S_3$ and switch $S_1$ is closed to allow the operation of the timing motor to continue. Continued rotation of the timing motor 52 will, after a period of time, return switch $S_1$ to its original position as shown in FIG. 4, opening the holding circuit, and re-establishing the original circuit through the timing motor. The return of switch $S_1$ to its original position also opens the relay circuit to de-energize the relay 56 and allow switches $S_3$, $S_4$ and $S_5$ to return to their original positions.

Referring again to the status of the overall circuit in which contacts 2 and 3 of switch $S_1$ are closed and the relay 56 is energized, the closure of contacts 2 and 3 of switch $S_4$ by the relay connects stand-by standard electrode 32 to the amplifier-comparator circuit 58. Thus, both standard electrodes 32 and 34, as well as the vessel 10, are, at such time, connected to the amplifier-comparator circuit 58. The amplifier-comparator circuit 58 then functions to monitor the potential differences between each of the standard electrodes 32 and 34 and the vessel 10 and to produce an amplified electrical current when any deviation between the two potential differences is detected. The amplified current output of the amplifier-comparator circuit 58 then flows to the switch $S_5$ which has been thrown by the relay 56 to close contacts 2 and 3. The output from the amplifier-comparator circuit 58 is thus directed to the signal sensing element 64.

The signal sensing element 64 comprises a suitable time delay device, such as the time delay relay depicted, and functions to prevent the actuation of the signal device 66 until a sufficient time has elapsed after relay 56 has been energized to permit the amplifier-comparator circuit 58 to become stabilized. In this way, it is possible to avoid an alarm signal which is indicative only of an unstabilized condition in the amplifier-comparator circuit 58, rather than being indicative of standard electrode malfunction. The precise nature of the signal sensing element 64 will necessarily be dependent upon the amount of deviation between the standard electrodes 32 and 34 which can be tolerated. In some cases, the amount of deviation which is allowable might be sufficiently large that the meter relay 62 could be utilized as the alarm sensing element.

The signal device 66 audibly or visibly responds to an output from the signal sensing element 64 to indicate to an operator the fact that one of the standard electrodes 32 or 34 is performing improperly. Appropriate corrective action may then be taken by the operator. If the faulty electrode is known (say, by reason of the inclusion of a suitable indicating device in the circuit) to be the working electrode 34, the stand-by electrode 32 may be placed in the anodic current control system—that is, made the working electrode—by throwing the double pole, double throw reversing switch 60. The faulty electrode 34 may then be replaced and the new electrode allowed to function as the stand-by standard electrode.

When the switch $S_1$ is not thrown by the timing motor 52 and the relay 56 is therefore de-energized, the switch $S_4$ does not connect the stand-by reference electrode 32 to the amplifier-comparator circuit 58, and the switch $S_5$ is positioned to connect the output of the amplifier-comparator circuit to the meter relay 62. Since the amplifier-comparator circuit 58 is, at this time, connected only to the working standard electrode 34 and to the vessel 10, it functions only to monitor the potential difference between these two elements. The current flowing in the circuit containing the cell formed by the vessel 10 and the working standard electrode 34 is thus amplified by the amplifier-comparator circuit 58, and the amplified current is then directed to the meter relay 62. The meter relay 62 functions to open switch $S_2$ and to throw the switch 28 in the corrosion control circuit to the "ON" position when the nobility of the metal of the vessel falls to the point where corrosion of the vessel proceeds at an undesirably high rate. The latter condition will, of course, be reflected by a substantial change in the magnitude of the amplified current output from the amplifier-comparator circuit 58. Since the switch $S_2$ is open at this time, the relay 56 cannot be energized and the amplifier-comparator circuit 58 cannot function to compare the standard electrodes 32 and 34.

In FIG. 5 of the accompanying drawings, a circuit is depicted in which the monitoring circuit of the present invention is incorporated in a proportional controller type of anodic polarization system. There is a substantial degree of similarity between the circuitry of this system and the ON-OFF switching type corrosion system depicted in FIG. 4. Therefore, where identical elements appear in the two circuits, they have been assigned identical reference characters. The primary differences between the structure of the proportional controller type circuit of FIG. 5 and the ON-ON switching circuit combination shown in FIG. 4 reside (a) the provision of a saturable reactor 74, a step-down transformer 76, and a rectifier 78 connected in series with a source of alternating current 80, and (b) in the employment of a proportional controller device 82 which includes a suitable element (not shown) for producing a direct current signal proportional to the potential difference between the vessel 10 and the working standard electrode 34, and also an amplifier for amplifiying such signal. The potential difference between the standard electrode 34 and vessel 10 is balanced against the predetermined potential difference of a set point 84, so that a current proportional to the departure of the vessel from its passive condition will pass to the proportional controller 82 when such loss of passivity occurs.

In the operation of the proportional controller type anodic polarization circuit, the proportional controller device 82 will detect any departure of the potential of the vessel from that value obtaining when the metal of the vessel is passive, and will convert such change in potential to an amplified direct current control signal which is passed through the control winding of the saturable reactor 74. The magnitude of the alternating current which passes through the saturable reactor 74 and is applied to the step-down transformer 76 and rectifier 78 is proportional to the magnitude of the direct current flowing in the control winding of the saturable reactor. Thus, the anodic direct current passed from the vessel 10 to the inert electrode 14 will always be proportional to the nobility of the vessel 10—that is, to its ability to resist corrosion.

Unlike the ON-OFF switching circuit having a reference electrode monitoring system incorporated therein, it is possible to operate the monitoring circuitry of the proportional controller type system of FIG. 5 simultaneously with the continuous control of anodic current. This is because no element corresponding to the meter relay 62 of FIG. 4 is required for the continued functioning of the portion of the circuitry which controls the flow of anodic current. Therefore, while the proportional controller device 82 and its associated saturable reactor 74 continue to control the flow of the corrective anodic current between the vessel 10 and inert electrode 14, the potential differences between the standard electrodes 32 and 34 and the vessel 10 may be applied to the amplifier-comparator circuit 58. When monitoring of the standard electrodes by comparison of the potential differences between standard electrodes 32 and 34 and the vessel 10 is not being effected by the amplifier-comparator circuit in the manner discussed above in describing the ON-OFF switching circuit in FIG. 4, the meter 86 provides an indication of the potential of vessel 10. These periods will, of course, occur when the timing motor 52 is in position to allow contacts 1 and 2 of switch $S_1$ to be closed and when relay 56 is therefore de-energized.

From the foregoing description of the operation of two anodic current corrosion control systems in which the present invention is incorporated, it will be apparent that a means is provided for maintaining a careful check on the proper functioning of the standard electrode used in such systems. Moreover, by having readily available a stand-by reference electrode which may be quickly and easily substituted in the corrosion control circuit for a faulty working electrode, losses of operating time are avoided and the maximum period of sustained operation is made virtually independent of standard electrode life. The monitoring system is completely automatic and is relatively economical from the standpoint of power consumption since a comparison between the working and stand-by standard electrode is made only periodically.

Changes may be made in the combination and arrangement of parts or elements as heretofore set forth in the specification and shown in the drawings, it being understood that changes may be made in the embodiments and steps disclosed without departing from the spirit and scope of the invention as defined in the following claims. For example, it will be apparent that switches for exchanging the function of the two standard electrodes, that is, for making the working standard electrode the stand-by electrode and vice versa, may be automatically actuated so that the system is automatically shifted over to stand-by electrode operation upon total failure of the working electrode.

I claim:

1. In a system for protecting a metallic vessel from corrosion by anodic polarization, apparatus for detecting malfunction of a standard, reference electrode comprising a second standard, reference electrode in electrical contact with the corrosive electrolyte in said vessel; means for comparing the potential differences between said reference electrodes and said vessel; and means responsive to said comparing means for actuating an alarm signal when the deviation between said compared potential differences exceeds a predetermined value.

2. Apparatus for detecting malfunction of a standard, reference electrode as claimed in claim 1 and further characterized to include means responsive to total failure of one of said reference electrodes to electrically connect the anodic current controller of said system to the other of said reference electrodes.

3. A system for minimizing corrosion of a metallic vessel containing a corrosive solution which comprises an inert electrode in the solution; a pair of identical standard, reference electrodes communicating electrochemically with the solution to provide a difference in potential between the vessel and said standard electrodes indicative of the nobility of the vessel; a proportional controller device connected to one of said standard electrodes and to said vessel for detecting deviation in the potential of said vessel from a preselected value and for generating a direct current control signal proportional to the said deviation; a source of alternating current; a saturable reactor connected to said source of alternating current and having its control winding connected to said proportional controller for receiving the direct current control signal therefrom; a step-down transformer connected to said saturable reactor for receiving the output therefrom; a rectifier connected to said step-down transformer and supplying direct current to said vessel and said inert electrode; and means for periodically comparing the differences in potential between said vessel and each of said standard electrodes whereby malfunctioning of one of said standard electrodes may be detected.

4. A system for minimizing corrosion of a metallic vessel as claimed in claim 3 wherein said means for periodically comparing the differences in potential between said vessel and each of said standard electrodes comprises electrical timing means connected to said source of alternating current; a first single pole, double throw switch connected in series with said electrical timing means and adapted to be periodically thrown by said electrical timing means; a relay connected between said first single pole, double throw switch and said source of alternating current; a holding circuit connected between said relay and said timing means and including first switch means responsive to said relay to close said holding circuit for continuing the operation of said timing means when said first single pole, double throw switch is thrown by said timing means; an amplifier-comparator circuit intermittently electrically connected to one of said standard electrodes and constantly electrically connected to the other of said standard electrodes and to said vessel for producing an amplified direct current output when said one standard electrode is electrically connected to said amplifier-comparator circuit and when the potential differences between said vessel and each of said standard electrodes deviate from each other, and, alternately, for producing an amplified direct current proportional to the potential difference between said other standard electrode and said vessel when said one standard electrode is electrically disconnected from said amplifier-comparator circuit; second switch means connected between said one electrode and said amplifier-comparator circuit and responsive to said relay for intermittently electrically connecting said one electrode to said amplifier-comparator circuit; and signal means connected to the output of said amplifier-comparator circuit.

5. A system for minimizing corrosion of a metallic vessel as claimed in claim 4 and characterized further to include a second single pole, double throw switch responsive to said relay and connected between said amplifier-comparator circuit and said signal means; and a meter connected to said second single pole, double throw switch and the output of said amplifier-comparator circuit whereby said signal means is adapted to receive the output from said amplifier-comparator circuit when said second single pole, double throw switch is thrown by said relay and said meter is adapted to receive the output from said amplifier-comparator circuit when said relay is de-energized.

6. A system for minimizing corrosion of a metallic vessel containing a corrosive solution which comprises an inert electrode in the solution; a source of direct current energy; anodic current control circuit means connecting the energy source to the inert electrode and to the vessel in a direction to make the inert electrode a cathode and the vessel an anode; a pair of identical standard, reference electrodes communicating electrochemically with the solution to provide a difference in potential between the vessel and the standard electrodes indicative of the nobility of the vessel; first switch means connected in said circuit means; controller means for throwing said first switch means to open said circuit means when the potential difference between one of said standard, reference electrodes and said vessel reaches a level corresponding to a predetermined maximum nobility of the vessel, and to close said circuit means when the potential difference between said one electrode and said vessel reaches a level corresponding to a predeterminde minimum nobility of said vessel; and means for periodically comparing the differences in potential between said vessel and each of said standard electrodes when said circuit means is opened by said controller.

7. A system for minimizing corrosion of a metallic vessel as claimed in claim 6 wherein said means for periodically comparing the differences in potential between said vessel and each of said standard, reference electrodes comprises a source of alternating current; electrical timing means connected to said source of alternating current; a first single pole, double throw switch connected in series with said electrical timing means and adapted to be periodically thrown by said timing means; a first relay connected between said first single pole, double throw switch and said source of alternating current; second switch means connected in series between the coil of said first relay and said source of alternating current; a holding circuit connected between said relay and said timing means and including third switch means responsive to said first relay to close said holding circuit for continuing the operation of said timing means when said first single pole, double throw switch is thrown by said timing means; an amplifier-comparator circuit intermittently electrically connected to one of said standard electrodes and constantly electrically connected to the other of said standard electrodes and to said vessel for producing an amplified direct current output when said one standard electrode is electrically connected to said amplifier-comparator circuit and when the potential differences between said vessel and each of said standard electrodes deviate from each other, and, alternately, for producing an amplified direct current proportional to the potential difference between said other standard electrode and said vessel when said one standard electrode is electrically disconnected from said amplifier-comparator circuit; fourth switch means connected between said one electrode and said amplifier-comparator circuit and responsive to said first relay for intermittently electrically connecting said one electrode to said amplifier-comparator circuit when said anodic current control circuit means is closed; signal means; and a second single pole, double throw switch responsive to said first relay and connected to the output of said amplifier-comparator circuit, said signal means and said controller means to electrically connect said signal means to the amplified direct current output of said amplifier-comparator circuit when said first relay is actuated and, alternately, to electrically connect said controller means to said amplifier-comparator circuit when said first relay is de-energized.

8. A system for minimizing corrosion of a metallic vessel as claimed in claim 7 wherein said controller means comprises a meter relay connected through said second single pole, double throw switch to the output of amplifier-comparator circuit; and a control relay responsive to said meter relay to close said first and second switch means when said meter relay is energized.

References Cited by the Examiner
UNITED STATES PATENTS

| | | | |
|---|---|---|---|
| 2,632,886 | 3/53 | Barney | 340—253 |
| 2,958,823 | 11/60 | Rabier | 324—133 |

NEIL C. READ, *Primary Examiner.*

ROBERT H. ROSE, *Examiner.*